(12) United States Patent
Wang (10) Patent No.: US 11,324,211 B2
(45) Date of Patent: May 10, 2022

(54) SPRAYER

(71) Applicant: INTRADIN (SHANGHAI) MACHINERY CO., LTD., Shanghai (CN)

(72) Inventor: Gaofeng Wang, Shanghai (CN)

(73) Assignee: INTRADIN (SHANGHAI) MACHINERY CO., LTD., Shanghai (CN)

( * ) Notice: Subject to any disclaimer, the term of this patent is extended or adjusted under 35 U.S.C. 154(b) by 21 days.

(21) Appl. No.: 17/010,405

(22) Filed: Sep. 2, 2020

(65) Prior Publication Data

US 2022/0030846 A1 Feb. 3, 2022

(30) Foreign Application Priority Data

Jul. 28, 2020 (CN) .......................... 202010738539.2

(51) Int. Cl.
*A01M 7/00* (2006.01)
*B05B 11/00* (2006.01)
*B05B 9/08* (2006.01)

(52) U.S. Cl.
CPC ............ *A01M 7/0046* (2013.01); *B05B 9/08* (2013.01); *B05B 11/0059* (2013.01); *B05B 11/0089* (2013.01)

(58) Field of Classification Search
CPC .... A01M 7/0046; B05B 9/08; B05B 11/0059; B05B 11/0089
See application file for complete search history.

(56) References Cited

U.S. PATENT DOCUMENTS

| 4,195,692 | A | * | 4/1980 | Dion-Biro | A62C 31/05 169/25 |
| 8,967,434 | B2 | * | 3/2015 | Lewandowski | B05B 15/652 222/383.1 |
| 10,342,934 | B2 | * | 7/2019 | Hong | A61M 15/0006 |
| 2011/0132935 | A1 | * | 6/2011 | Greer, Jr. | B65D 5/00 222/402.1 |
| 2017/0241423 | A1 | * | 8/2017 | Han | F04D 29/4226 |
| 2018/0355875 | A1 | * | 12/2018 | Freeland | F04D 25/084 |
| 2019/0128281 | A1 | * | 5/2019 | He | F04D 25/068 |

FOREIGN PATENT DOCUMENTS

| CN | 106040472 A | 10/2016 | |
| CN | 206196760 U | 5/2017 | |
| WO | WO-2019171405 A1 * | 9/2019 | .......... A01M 7/0003 |

* cited by examiner

*Primary Examiner* — Donnell A Long (57) ABSTRACT

A sprayer includes a spray nozzle, a blower and a sprayer housing. The sprayer housing is configured to contain a liquid. The spray nozzle and the sprayer housing are connected. The spray nozzle is configured to spray the liquid out from the sprayer housing. The blower is fixedly connected with the spray nozzle, and the spray nozzle is connected to the sprayer housing through the blower. The blower is rotatable with respect to the sprayer housing so as to adjust the angle of the blower with respect to the sprayer housing, thereby enabling the angle of the spray nozzle to be adjusted with respect to the sprayer housing. The angle of the spray nozzle with respect to the sprayer housing is adjustable, so the spray nozzle is capable of ejecting the liquid at different angles with respect to the sprayer housing without moving the sprayer.

6 Claims, 10 Drawing Sheets

SPRAYER

CROSS-REFERENCE TO RELATED APPLICATIONS

This application claims the benefit of priority from Chinese Patent Application No. 202010738539.2, filed on Jul. 28, 2019. The content of the aforementioned applications, including any intervening amendments thereto, is incorporated herein by reference in its entirety.

TECHNICAL FIELD

The present application relates to agricultural equipment, and more particularly to a sprayer.

BACKGROUND

Generally, sprayers that are heavy are not able to work at any angle. In order to allow liquid spraying in different directions, the sprayers have to be held and moved around. This is not convenient to use.

SUMMARY

Based on this, the main purpose of this application is to provide a sprayer with an angle adjustable spray nozzle.

An object of the present disclosure is to provide a sprayer, comprising:
a sprayer housing, configured to contain a liquid;
a spray nozzle, connected to the sprayer housing and configured to spray the liquid out from the sprayer housing; and
a blower, connected with the spray nozzle and the sprayer housing;
wherein the blower is rotatable with respect to the sprayer housing, so as to adjust an angle of the blower with respect to the sprayer housing, enabling an angle of the spray nozzle to be adjusted with respect to the sprayer housing; and the blower is configured to provide the spray nozzle with a force for spraying the liquid out from the sprayer housing through the spray nozzle.

In some embodiments, the sprayer further comprises an adjusting part; the blower is connected to the sprayer housing through the adjusting part, and the blower is rotatable with respect to the sprayer housing through the adjusting part, so that the angle of the blower with respect to the sprayer housing is adjustable.

In some embodiments, there are a plurality of adjusting parts.

In some embodiments, the sprayer further comprises a fixing assembly for fixedly connecting the sprayer housing and the adjusting part.

In some embodiments, the fixing assembly comprises an elastic component and a fixing block; one end of the elastic component is connected with the sprayer housing, the fixing block is connected with the adjusting part, and the adjusting part is rotatable with respect to the fixing block; the fixing block is engaged with different positions of an outer circumference of the adjusting part, so that the angle of the blower with respect to the sprayer housing is adjustable. The elastic component is configured to provide an elastic force to the fixing block to maintain the engagement between the fixing block and the adjusting part.

In some embodiments, a plurality of first teeth spaced apart are arranged on the outer circumference of the adjusting part, and a plurality of the second teeth spaced apart are arranged on a side of the fixing block facing the adjusting part, and the second teeth engage with different positions of the first teeth to realize the engagement of the adjusting part and the different positions on the outer circumference of the fixing block.

In some embodiments, the spray nozzle comprises a transmission component and a blade assembly, the blower is connected to the blade assembly via the transmission component, and the blade assembly is rotatable with respect to the transmission component to form a vacuum environment inside the blade assembly, so that the liquid to be atomized under atmospheric pressure enters the blade assembly through the transmission component, and the blade assembly drives the liquid in the fan assembly to rotate, so that the liquid is atomized and sprayed out from the blade assembly.

In some embodiments, the blade assembly comprises a fan blade and a water outlet connected to the fan blade; the water outlet is hollow; and the transmission component passes through the fan blade and extends to an interior of the water outlet; the water outlet rotates with the fan blade with respect to the transmission component to form a vacuum environment inside the water outlet, so that the liquid under atmospheric pressure enters the blade assembly through the transmission component; and the blade assembly drives the liquid in the fan assembly to rotate, so that the liquid is atomized and sprayed out from the blade assembly.

In some embodiments, the blade assembly further comprises a connecting pipe; the fan blade and the water outlet are arranged on the connecting pipe; the transmission component is inserted in one end of the connecting pipe; and the fan blade rotates with respect to the transmission component, and the water outlet is driven to rotate through the connecting pipe; and the liquid under atmospheric pressure enters the water outlet via the transmission component and the connecting pipe.

In some embodiments, the water outlet is flared towards an end of the water outlet away from the fan blade.

The technical solution of the present application has the following advantages. The blower provides the spray nozzle with a force to make the liquid in the sprayer housing enter the spray nozzle, which can atomize the liquid and spray the liquid out from the spray nozzle. According to different environments or user requirements, by adjusting the angle of the spray nozzle with respect to the sprayer housing, the spray nozzle sprays at different angles with respect to the sprayer housing without moving the sprayer, so that the sprayer has a larger spraying range, thus making the sprayer more convenient to use and labor-saving.

BRIEF DESCRIPTION OF THE DRAWINGS

In order to more clearly explain the embodiments of the present application or the technical solutions in the prior art, the accompanying drawings of the present disclosure will be described as follows. Obviously, the drawings described below are only some embodiments of the present application. For those of ordinary skill in the art, other drawings can be obtained based on the accompanying drawings without paying any creative efforts.

In the drawings, 1, transmission component; 11, first side surface; 12, first end surface; 13, first cavity; 2, blade assembly; 21, fan blade; 22, water outlet; 221, first thread; 23, connecting pipe; 231, second side surface; 232, second end surface; 233, second thread; 234, second cavity; 235, first opening; 3, bearing; 31, inner ring; 32, outer ring; 4, bearing locating part; 5, fixture; 6, extension part; 100, spray nozzle; 200, sprayer body; 210, blower; 211, mesh structure; 220, sprayer housing; 230, container; 2301, third opening; 240, container lid; 250, case 260, adjusting part; 261, second opening; 2611, first sub-opening; 2612, second sub-opening; 2613, third sub-opening; 262, first teeth; 300, spray nozzle housing; 400, fixing assembly; 410, elastic component; 420, fixing block; 421, second teeth; 500, spacer; 600, handle; 700, switch button; 800, valve switch.

DETAILED DESCRIPTION OF EMBODIMENTS

The invention will be further described clearly and completely below with reference to the accompanying drawings in embodiments. Obviously, the described embodiments are only a part of the embodiments of the present invention, but not all the embodiments. Based on the embodiments of the present invention, all other embodiments obtained by those of ordinary skill in the art without making creative efforts, fall within the protection scope of the present invention.

It should be noted that all directional indications (such as up, down, left, right, front, rear, etc.) in the embodiment of the present invention are only used to explain the relative position relationship, movement situation, etc. between the components under a certain attitude (as shown in the attached figure). If the specific posture changes, the directional indication changes accordingly. In addition, terms "first", "second", etc. in the present disclosure are only for descriptive purposes, and cannot be understood as indicating or implying their relative importance or implicitly indicating the number of technical features indicated. Thus, the features defined as "first" or "second" may explicitly or implicitly indicate that at least one of the features is included. The term "and/or" includes any one of or any combination of two or more of the listed items. In addition, various embodiments can be combined with each other, in a manner that enables the implementation of the present invention by those skilled in the art, and the combination of the embodiments that is expected in an inappropriate way will not be considered as falling within the spirit of the present invention.

The specific structures of the sprayer of the present disclosure are described as follows.

Figure 1:
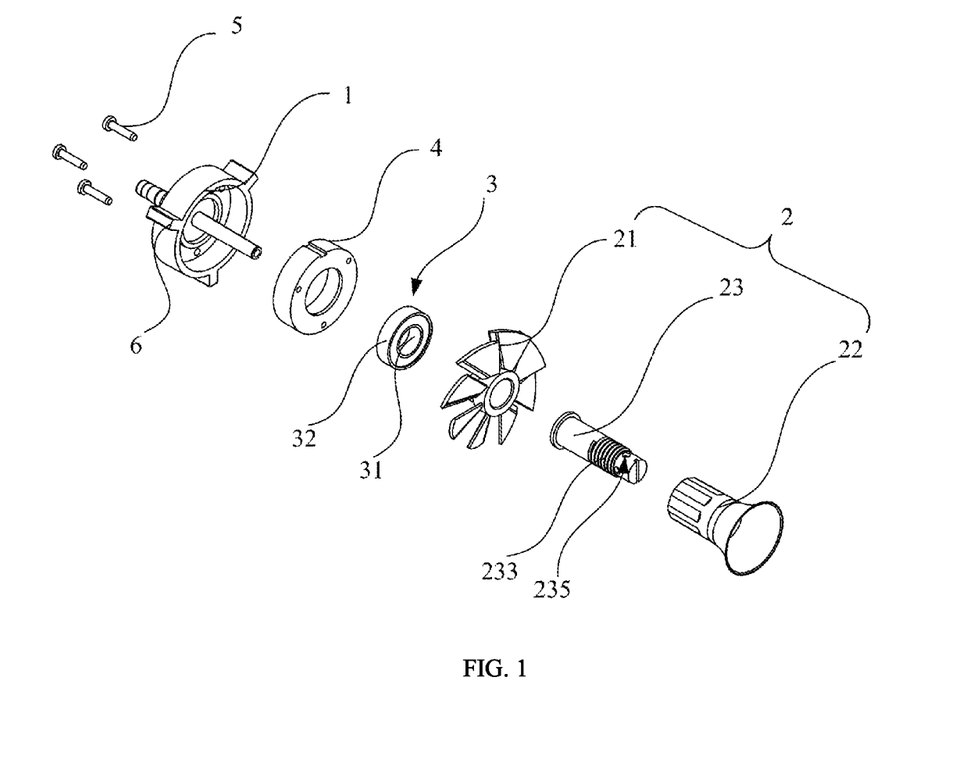
FIG. 1 is an exploded view of a spray nozzle according to an embodiment of the present disclosure.

As shown in FIG. 1, the spray nozzle 100 includes a transmission component 1 and a blade assembly 2 which is connected to the transmission component 1. The blade assembly 2 is rotatable with respect to the transmission component 1 to form a vacuum environment inside the blade assembly 2, so that the liquid to be atomized under atmospheric pressure can enter the interior of the blade assembly 2 through the transmission component 1, and the blade assembly 2 can also drive the liquid in the interior of the blade assembly 2 to rotate, so that the liquid can be atomized and sprayed out from the blade assembly 2.

The blade assembly 2 rotates with respect to the transmission component 1 to form a vacuum environment inside the blade assembly 2, so that the liquid under atmospheric pressure enters the blade assembly 2 through the transmission component 1. The liquid in the blade assembly 2 rotates with the blade assembly 2, so that the liquid can be atomized and sprayed out. In the present application, the liquid in the blade assembly 2 rotates together with the blade assembly 2, so that the liquid is more uniformly distributed inside the blade assembly 2, thus achieving a better atomization effect.

Figure 2:
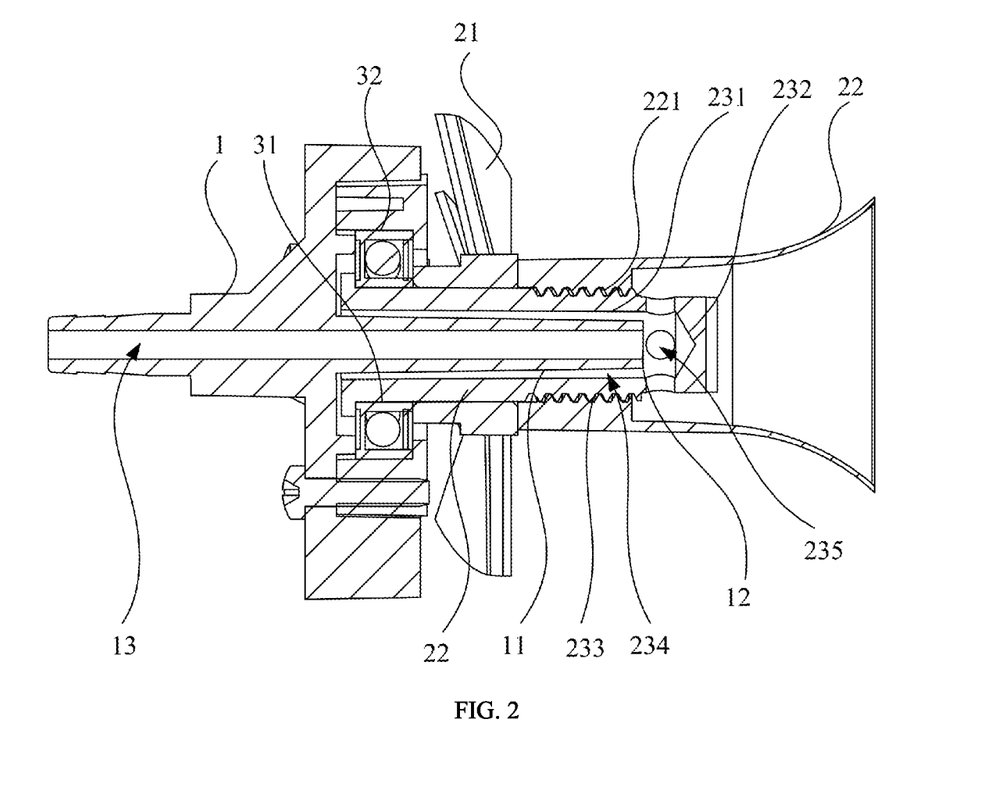
FIG. 2 is a cross-sectional view of the spray nozzle according to an embodiment of the present disclosure.

As shown in FIGS. 1-2, the blade assembly 2 includes a fan blade 21 and a water outlet 22 connected with the fan blade 21. The transmission component 1 passes through the fan blade 21 and extends into the water outlet 22. The water outlet 22 rotates with the fan blade 21 with respect to the transmission component 1 to create a vacuum environment inside the water outlet 22, and the liquid to be atomized under atmospheric pressure enters the blade assembly 2 through the transmission component 1, and the water outlet 22 drives the liquid in the water outlet 22 to rotate, so as to atomize and eject it from the water outlet 22.

The rotation of the fan blade 21 generates a force to blow the liquid sprayed from the water outlet 22, so that the liquid is further atomized and ejected farther.

The blade assembly 2 also includes a connecting pipe 23 on which the fan blade 21 and the water outlet 22 are arranged. The transmission component 1 is inserted into one end of the connecting pipe 23. The fan blade 21 rotates with respect to the transmission component 1 to drive the water outlet 22 to rotate via the connecting pipe 23, and the liquid under atmospheric pressure enters the water outlet 22 through the transmission component 1 and connecting pipe 23.

As shown in FIGS. 1-2, the water outlet 22 is flared towards an end of the water outlet 22 away from the fan blade 21, which facilitates the outward spraying of the liquid entering the water outlet 22, and more uniform distribution of the liquid, thus resulting in a better atomization effect of the liquid. In other embodiments, the water outlet 22 is not limited to a flared shape.

As shown in FIG. 2, there is a gap between the transmission component 1 and the connecting pipe 23, so that the connecting pipe 23 is avoided to directly contact with the transmission component 1 when the connecting pipe 23, the fan blade 21 and the water outlet 22 rotate with respect to the transmission pipe 1, so as to reduce the rotational resistance of the connecting pipe 23.

As shown in FIG. 2, in an embodiment, the transmission component 1 includes a first side surface 11 and a first end surface 12, and the connecting pipe 23 includes a second side surface 231 facing the first side surface 11 and the second end surface 232 facing the second end surface 12. There is a first gap between the first end surface 12 and the second end surface 232, and there a second gap between the first side surface 11 and the second side surface 231, and the first gap and the second gap form the gap.

As shown in FIGS. 1-2, an inner wall of the water outlet 22 is provided with a first thread 221, and an outer wall of the connecting pipe 23 is provided with a second thread 233. The first thread 221 and the second thread 233 are screwed together to make the water outlet 22 and the connecting pipe 23 fixedly connected. Specifically, the first thread 221 is an internal thread, and the second thread 233 is an external thread.

As shown in FIG. 2, transmission component 1 includes a first cavity 13, and the connecting pipe 23 includes a second cavity 234. The first cavity 13 is communicated with the second cavity 234, and the second cavity 234 is communicated with an interior of the water outlet 22. The liquid can enter the interior of the water outlet 22 through the first cavity 13 and the second cavity 234. Specifically, the first cavity 13 may be cylindrical. In the case that the first cavity 13 is cylindrical, the liquid flows faster in the first cavity 13, and the load applied in the first cavity 13 is uniformly distributed. The second cavity 234 may be cylindrical, and the load applied in the second cavity 234 is uniformly distributed.

As shown in FIGS. 1-2, a first opening 235 is provided on a side wall of the connecting pipe 23 and is configured to allow the second cavity 234 to communicate with the water outlet 22. The liquid can enter the water outlet 22 passing through the first cavity 13, the second cavity 234 and the first opening 235. Specifically, the first opening 235 may have a circular shape.

In an embodiment, a plurality of first openings 235 spaced part are arranged on the side wall of the connecting pipe 23, which allows the liquid in the second cavity 234 of the connecting pipe 23 to enter the water outlet 22 from different directions, the liquid is better dispersed in the water outlet 22, thus enhancing the liquid atomization.

In this embodiment, there are four first openings 235. The four first openings 235 are spaced apart and are arranged on the side wall of the connecting pipe 23. The liquid in the second cavity 234 of the connecting pipe 23 can enter the water outlet 22 from different directions. It should be understood that, in other embodiments, the specific number of the openings can be reasonably selected according to the actual situation and is not limited herein.

As shown in FIGS. 1-2, the spray nozzle 100 further includes a bearing 3 which is arranged on the blade assembly 2 and is configured to support the blade assembly 2, and the blade assembly is rotatably connected to the transmission component 1 through the bearing 3. Specifically, the bearing 3 is arranged on the connecting pipe 23. One end of the bearing 3 is in contact with the connecting pipe 23, and the other end of the bearing 3 is in contact with the one end of the fan blade 21 away from the water outlet 22. The fan blade 21 and the connecting pipe 23 limit the movement of the bearing in an axial direction.

As shown in FIGS. 1-2, the spray nozzle 100 further includes a bearing locating part 4 which is sheathed on the bearing 3. The bearing locating part 4 is configured to locate the bearing 3 and is connected to the transmission component 1. The blade assembly 2 is connected to the transmission component 1 through the bearing 3 and the bearing locating part 4.

As shown in FIGS. 1-2, the spray nozzle 100 further includes a fixture 5. The fixture 5 passes through the transmission component 1 and is connected to the bearing locating part 4. The bearing locating part 4 and the transmission component 1 are connected via the fixture 5.

In an embodiment, a plurality of fixtures spaced apart pass through the transmission component 1 to connect with the bearing locating part 4, so as to achieve a reliable connection between the bearing locating part 4 and the transmission component 1. In this embodiment, there are three fixtures 5, and the three fixtures 5 spaced apart pass through the transmission component 1 to connect to the bearing locating part 4. It should be understood that, in other embodiments, the specific number of the fixture can be selected reasonably according to actual conditions, and is not limited to three. Specifically, the fixture 5 may be screws.

As shown in FIGS. 1-2, the bearing 3 includes an inner ring 31 and an outer ring 32 which is rotatably sheathed on the inner ring 31, and the inner ring 31 is arranged on the connecting pipe 23, and the bearing locating part 4 is arranged on the outer ring 32. The rotation of the fan blade 21 drives the connecting pipe 23 and the water outlet 22 to rotate. The connecting pipe 23 drives the inner ring 31 of the bearing 3 to rotate, and the outer ring 32 does not rotate with the inner ring 31 of the bearing 3, so that the transmission component 1 which is connected to the bearing 3 via the bearing locating part 4 does not rotate accordingly, that is, when the blade assembly 2 including the fan blade 21, the connecting pipe 23 and the water outlet 22 rotates, the transmission component 1 does not follow the blade assembly to rotate.

Figure 4:
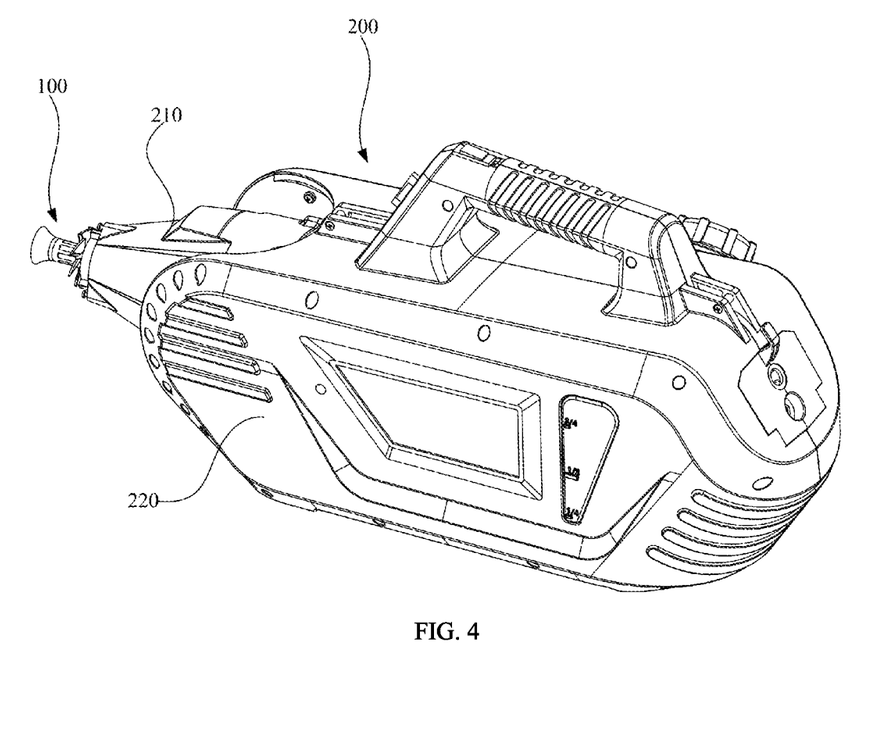
FIG. 4 is an axonometric view of a sprayer according to an embodiment of the present disclosure.

As shown in FIGS. 2 and 4, the present disclosure provides a sprayer, and the sprayer includes the spray nozzle 100, a blower 210 and a sprayer housing 220. The sprayer housing 220 is configured to contain a liquid, and the spray nozzle 100 is connected to the sprayer housing 220. The spray nozzle 100 is configured to spray out the liquid in the sprayer housing 220. The blower 210 is connected to the spray nozzle 100 and the sprayer housing 220. The blower 210 is rotatable with respect to the sprayer housing 220, so that the angle of the blower 210 is adjustable with respect to the sprayer housing 220, and the angle of the spray nozzle 100 is adjustable with respect to the sprayer housing 220. The blower 210 is configured to provide the spray nozzle 100 with a force to spray the liquid in the sprayer housing 220 out from the spray nozzle 100.

In this embodiment, the blower 210 and the sprayer housing 220 constitute a sprayer body 200.

The spray nozzle 100 includes a transmission component 1 and a blade assembly 2. The blower 210 is connected to the blade assembly 2 via the transmission component 1. The blade assembly 2 is rotatable with respect to the transmission component 1 to form a vacuum environment inside the blade assembly 2, so that the liquid to be atomized under atmospheric pressure enters the blade assembly 2 through the transmission component 1. The blade assembly 2 also drives the liquid entering the blade assembly 2 to rotate, so that the liquid is atomized and ejected from the blade assembly 2.

The sprayer body 200 drives the blade assembly 2 to rotate with respect to the transmission component 1 to form a vacuum environment inside the blade assembly 2, so that the liquid inside the sprayer body 200 under the atmospheric pressure enters the blade assembly 2 through the transmission component 1. The blade assembly 2 also drives the liquid inside the blade assembly 2 to rotate, so that the liquid inside the blade assembly is atomized and sprayed out from the blade assembly 2.

Figure 3:
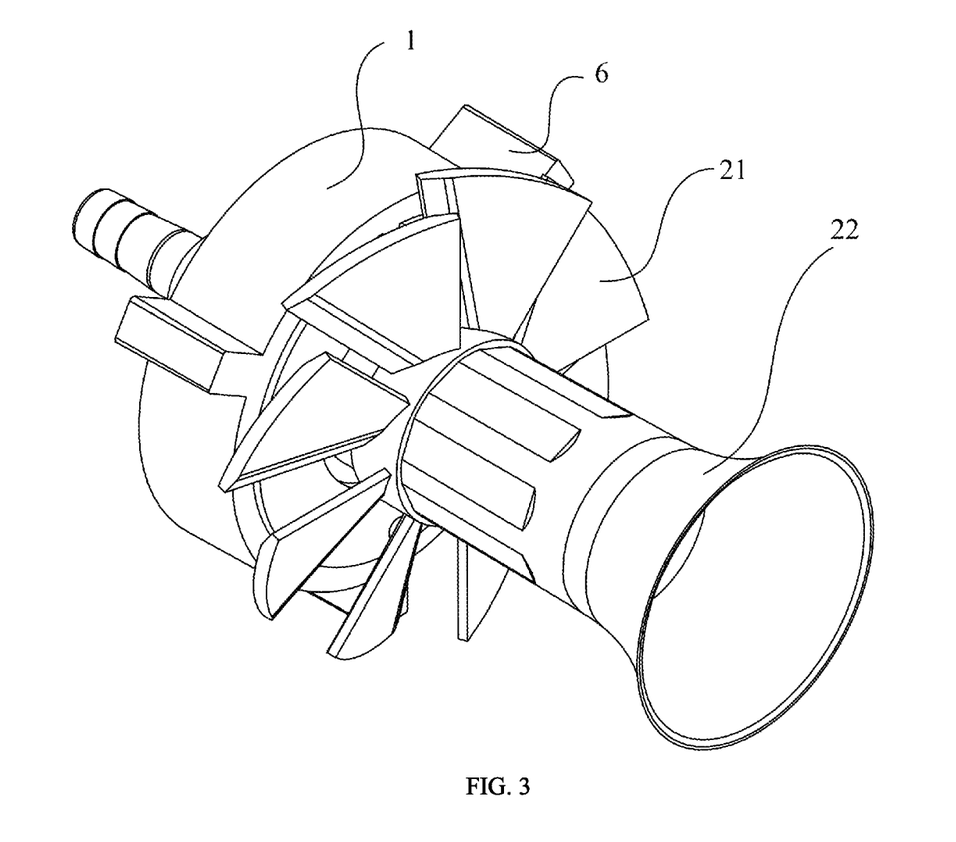
FIG. 3 is an axonometric view of the spray nozzle according to an embodiment of the present disclosure.

As shown in FIGS. 2-4, the blower 210 is rotatable with respect to the sprayer housing 220, so that the angle of the blower 210 is adjustable with respect to the sprayer housing 220, and the angle of the spray nozzle 100 that connected to the blower 210 is adjustable with respect to the sprayer housing 220. Specifically, by adjusting the angle of the spray nozzle 100 with respect to the sprayer housing 220, the spray nozzle 100 sprays at different angles with respect to the sprayer housing 220 without moving the sprayer, so that the sprayer has a larger spraying range, thus making the sprayer more convenient to use.

Figure 7:
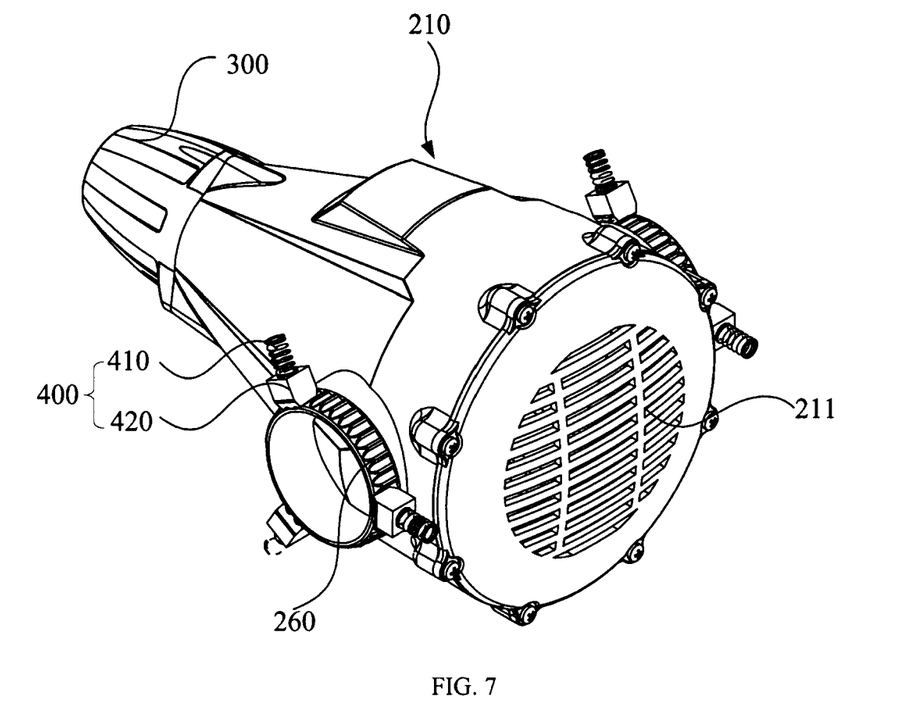
FIG. 7 is an axonometric view of a spray nozzle and a blower according to an embodiment of the present disclosure.
Figure 8:
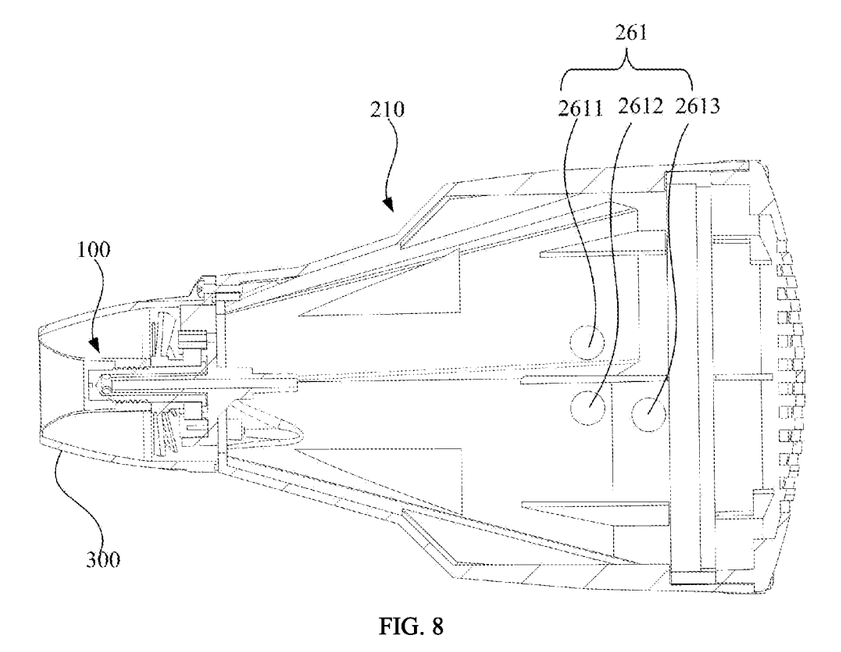
FIG. 8 is a cross-sectional view of the spray nozzle and the fan according to an embodiment of the present disclosure.

As shown in FIG. 7, a mesh structure 211 is provided at one side of the blower 210 facing the sprayer housing 220. Specifically, the interior and the exterior of the blower 210 are communicated through the mesh structure. The external air enters the interior of the blower 210 through the mesh structure 211. The mesh structure 211 is capable of blocking external large pollutants from entering the blower 210, so that the normal operation of the blower 210 is avoided to be affected by the large pollutants.

Figure 5:
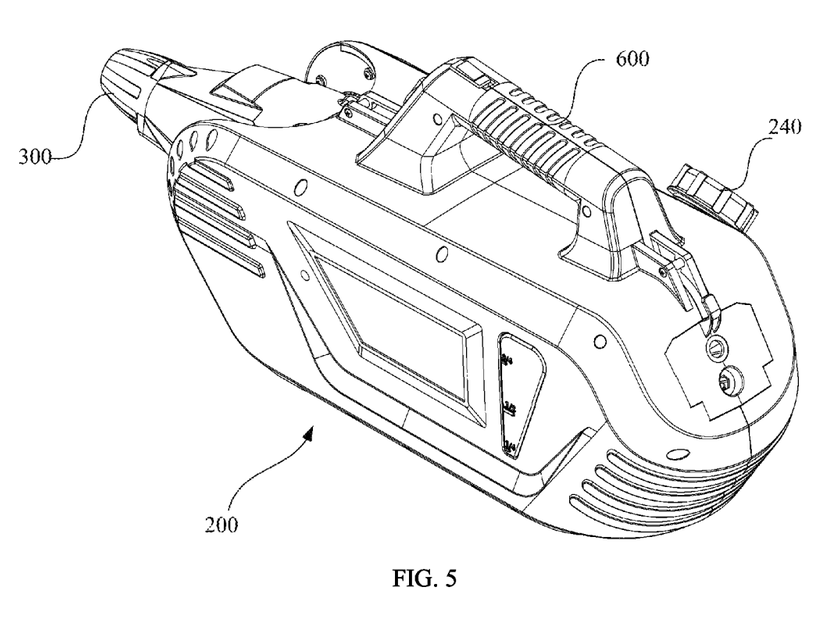
FIG. 5 is an axonometric view of the sprayer with a spray nozzle housing according to an embodiment of the present disclosure.
Figure 6:
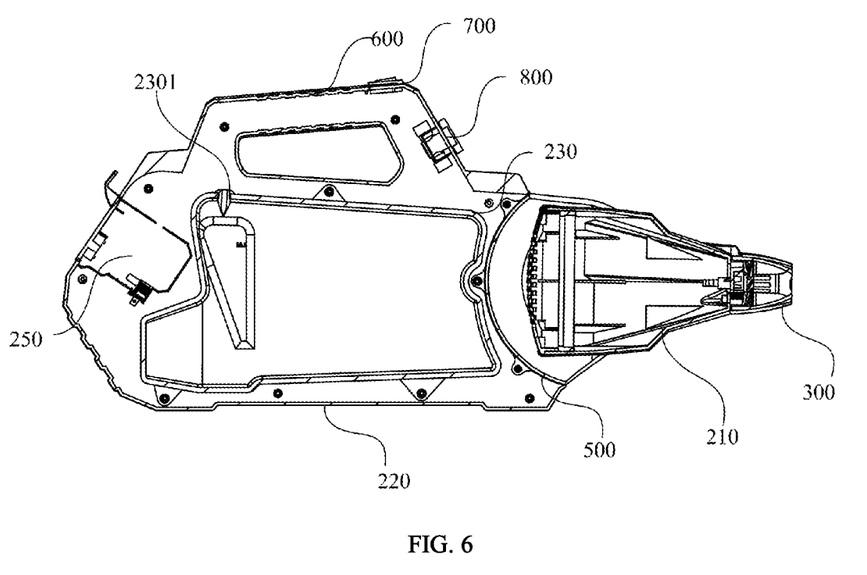
FIG. 6 is a cross-sectional view of the sprayer with the spray nozzle housing according to an embodiment of the present disclosure.

As shown in FIGS. 5-6, the sprayer further includes a spray nozzle housing 300 in which the spray nozzle 100 is arranged, and the spray nozzle housing 300 is connected to the sprayer housing 220.

As shown in FIGS. 1-10, the spray nozzle further includes an extension part 6 arranged on the outer wall of the transmission component 1. The transmission component 1 is connected to the spray nozzle housing 300 via the extension part 6. In an embodiment, a plurality of extension parts 6 spaced apart are arranged on the outer wall of the transmission component 1. The transmission component 1 is reliably connected to the spray nozzle housing 300 through the extension parts 6. In this embodiment, there are three extension parts 6. The three extension parts 6 spaced apart are arranged on the outer wall of the transmission component 1. It should be understood that, in other embodiments, the specific number of extensions part 6 is reasonably selected according to actual conditions, and is not limited herein.

As shown in FIG. 6, the sprayer body 200 further includes a container 230 disposed in the sprayer housing 220, and configured for containing a liquid. Specifically, a portion of the container 230 extends to the outside of the sprayer housing 220, and an opening is provided on the portion of the container 230 that extends to the outside of the sprayer housing 220, so that the user can inject the liquid into the container 230 from the opening.

The sprayer body 200 further includes a container lid 240 arranged at the opening of the container 230. Specifically, the container lid 240 covers the opening of the container 230 after the liquid is injected into the container 230, so as to prevent the liquid from spilling out of the container 230 and prevent pollutants entering the container lid 230 through the opening of the container 230 when the sprayer is in use.

The sprayer body 200 further includes a power source arranged in the sprayer housing 220, and the power source is electrically connected to the blower 210 to supply power to the blower 210.

As shown in FIG. 6, the sprayer body 200 further includes a case 250 which is arranged in the sprayer housing 220 and is spaced from the container 230. The power source is set in the case 250. Specifically, the case 250 is provided to avoid the direct contact between the power source and the liquid inside the container 230, so that the short circuit of the power source can be avoided, thereby improving the safety of the power source.

The sprayer body 200 further includes wires, and the power source is electrically connected to the blower 210 via the wires.

The sprayer also includes a first tube. One end of the first tube is connected to the transmission component 1, and the other end of the first tube is inserted into the sprayer housing 220. The liquid in the sprayer housing 220 enters the blade assembly 2 via the first tube and the transmission component 1.

The sprayer also includes a second tube. One end of the second tube is inserted into the blower 210, and the other end of the second tube is inserted into the container 230. The second tube is used to pass the wind pressure generated by the blower 210 into the container 230 to result in a larger pressure in the container 230. On the one hand, the water outlet 22 rotates with respect to the transmission component 1 to form a vacuum environment inside the water outlet 22, so that the liquid to be atomized under atmospheric pressure enters the water outlet through the transmission component 1. On the other hand, the second tube passes the wind pressure generated by the blower 210 into the container 230, so as to result in a larger pressure in the container 230. In this way, the liquid in the container 230 can enter the blade assembly 2 more quickly.

As shown in FIGS. 6-7, the sprayer body 200 further includes an adjusting part 260 through which the blower 210 is connected to the sprayer housing 220. The adjusting part 260 is rotatable with respect to the sprayer housing 220, so that the angle of the blower 210 with respect to the sprayer housing 220 can be adjusted, and the angle of the spray nozzle 100 connected to the blower 210 with respect to the sprayer housing 220 can be adjusted. Specifically, the adjusting part 260 is cylindrical.

As shown in FIGS. 7-8, in an embodiment, a plurality of adjusting parts 260 spaced apart are arranged on the blower 210, which leads to a reliable connection between the blower 210 and the sprayer housing 220. In this embodiment, two adjusting parts 260 spaced apart are arranged on the blower 210. It should be understood that, in other embodiments, the specific number of the adjusting part 260 is reasonably selected according to actual conditions, and is not limited herein.

The adjusting part 260 is provided with a second opening 261 configured to allow at least one of the first tube, the second tube and the wires to extend into the sprayer housing 220.

In this embodiment, the second opening 261 includes a first sub-opening 2611, a second sub-opening 2612, and a third sub-opening 2613 which are spaced apart on the adjusting part 260. The first tube passes through the first sub-opening 2613 to realize the connection between the transmission component 1 and the sprayer housing 220, and the second tube passes through the second sub-opening 2612 to realize the connection between the blower 210 and the sprayer housing 220, and the wires pass through the third sub-opening 2613 to realize the electrical connection between the energy supply device and the blower 210. Specifically, the first sub-opening 2611, the second sub-opening 2612, and the third sub-opening 2613 are used to prevent the mutual interference among the first tube, the second tube and the wires.

The container 230 is provided with two third openings 2301. The first tube passes through the first sub-opening 2611 and one third openings 2301 to realize the connection between the transmission component 1 and the sprayer housing 220, and the second tube passes through the second sub-opening 2612 and the other third opening 2301 to realize the connection between the blower 210 and the sprayer housing 220.

As shown in FIG. 7, the sprayer further includes a fixing assembly 400 for fixedly connecting the sprayer housing 220 and the adjusting part 260.

As shown in FIG. 7, the fixing assembly 400 includes an elastic component 410 and a fixing block 420. One end of the elastic component 410 is connected to the sprayer housing 220, and the other end of the elastic component 410 is connected with the fixing block 420. The adjusting part 260 is rotatable with respect to the fixing block 420, and the fixing block 420 can engage with different positions of an outer circumference of the adjusting part 260. The elastic component 410 is configured to provide the fixing block 420 with an elastic force for keeping the fixing block 420 engaged with the adjusting part 260. Specifically, the elastic component 410 may be a spring.

In the initial state, the elastic component 410 is compressed, and the elastic component 410 can provide the fixing block 420 with an elastic force to keep the fixing block 420 engaged with the adjusting part 260. The fixing block 420 is engaged with a first position of the adjusting part 260, so that the sprayer housing 220 is positioned at a first angle with respect to the blower 210, and the blower 210 is fixed to the sprayer housing 220. When the angle of the spray nozzle 100 with respect to the sprayer housing 220 needs to be adjusted, an external force is applied to the spray nozzle 100 or the blower 210 to drive the spray nozzle 100 and blower 210 rotate together with respect to the sprayer housing 220. At this time, the elastic force of the elastic component 410 is offset by the external force, and the adjusting part 260 is separated from the fixing block 420 and rotates with respect to the fixing block 420, and the elastic component 410 is further compressed. When the spray nozzle 100 and the blower 210 are rotated to a required second angle with respect to the sprayer housing 220, the external force exerted on the spray nozzle 100 or the blower 210 is removed, and the elastic component 410 is elastically reset. The fixing block 420 is engaged with a second position of the adjusting part 260 under the elastic force of the elastic component 410, so that the spray nozzle 100 and the blower 210 are positioned at a second angle with respect to the sprayer housing 220.

It should be noted that, since one end of the elastic component 410 is fixedly connected to the sprayer housing 220, and the other end of the elastic component 410 is fixedly connected to the fixing block 420, the adjusting part 260 will not drive the fixing block 420 to rotate together when rotating with respect to the fixing block 420.

Figure 9:
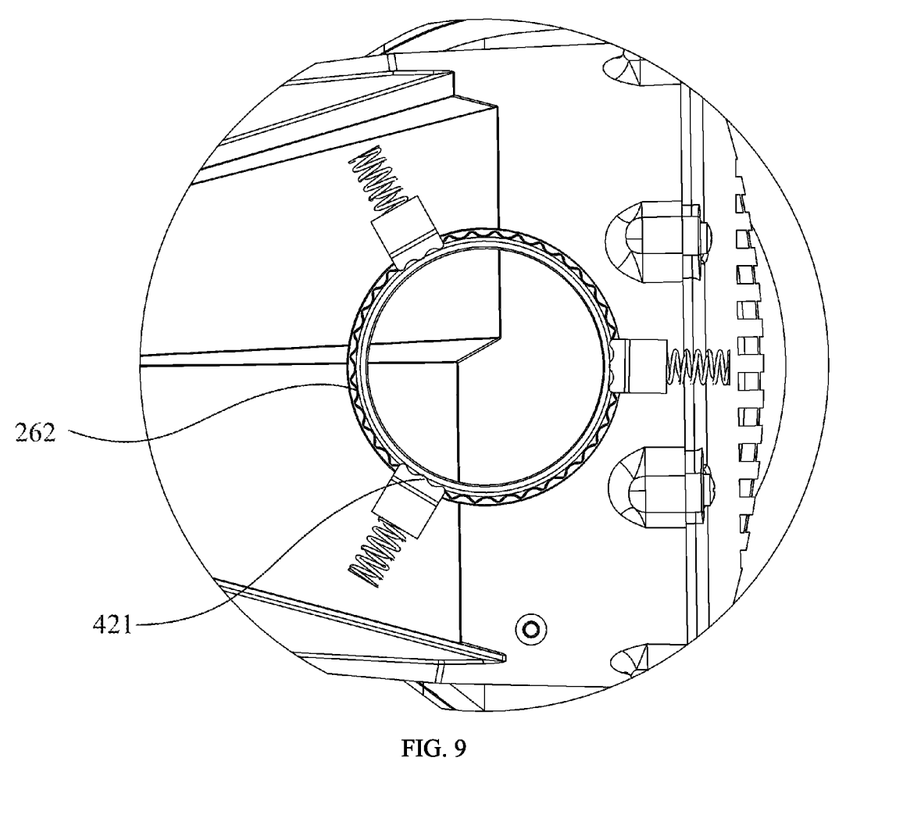
FIG. 9 schematically shows the cooperation between the adjusting part and the fixing assembly according to an embodiment of the present disclosure.
Figure 10:
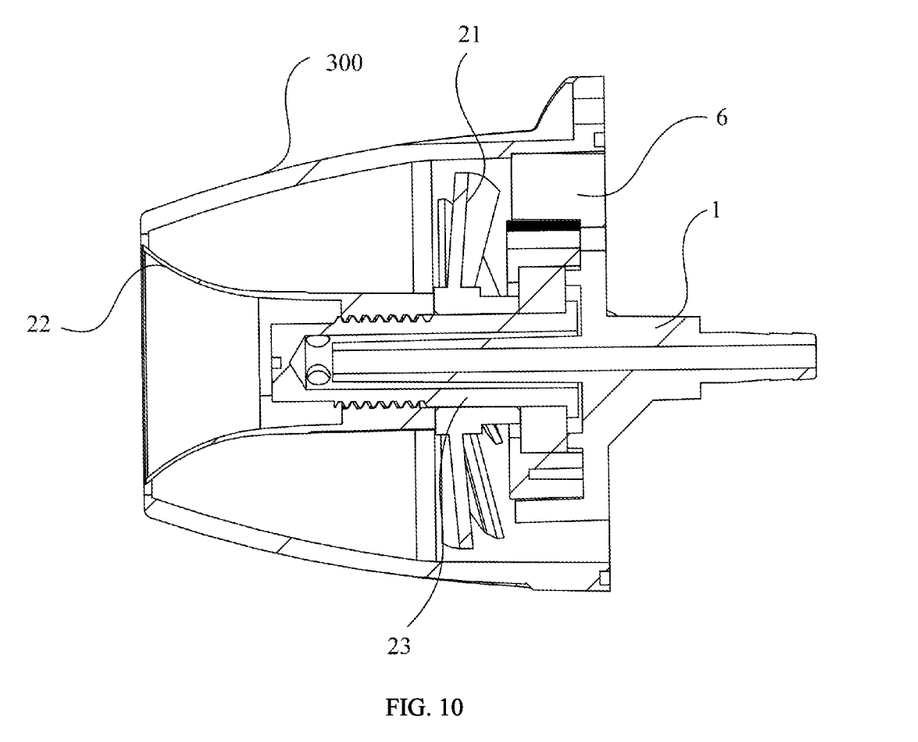
FIG. 10 is a cross-sectional view of the spray nozzle and the spray nozzle housing according to an embodiment of the present disclosure.

As shown in FIGS. 6-7 and 9, a plurality of first teeth 262 spaced apart are arranged on the outer circumference of the adjusting part 260, and a plurality of second teeth 421 spaced apart are arranged on aside of the fixing block 420 facing the adjusting part 260. The second teeth 421 can engage with the first teeth 262 at different positions to realize the engagement of the adjusting part 260 and the outer side of the fixing block 420 at different positions.

As shown in FIG. 6, the sprayer further includes a spacer 500 disposed between the sprayer housing 220 and the blower 210, and configured to separate the sprayer housing 220 with the blower 210.

As shown in FIGS. 5-6, the sprayer further includes a handle 600 arranged on the sprayer housing 220. The sprayer can be easily transferred by the handle 600.

As shown in FIG. 6, the sprayer further includes a switch button 700 arranged on the sprayer housing 220 and is configured to control the start and stop of the blower 210. Specifically, the switch button 700 is arranged on the handle 600.

As shown in FIG. 6, the sprayer further includes a valve switch 800 arranged on the sprayer housing 220 and is configured to control the on and off of the first tube. Specifically, the valve switch 800 is arranged on the handle 600. The switch button 700 and the valve switch 800 are spaced. The valve switch 800 is closed when the sprayer stops working, so that the first tube is blocked, preventing the liquid in the container 230 from entering the blade assembly 2 and dripping from the blade assembly 2.

Referring to FIGS. 1-10, the mechanism of the sprayer is described as follows.

The valve switch 800 is turned on to make the first tube to communicate with the container and the blade assembly. The switch button 700 is turned on to start the blower 210, and the blower 210 drives the blade assembly 2 to rotate to generate a partial vacuum in the blade assembly 2. The liquid in the container 230 under the atmospheric pressure enters the blade assembly 2 through the first tube, and the liquid in the blade assembly 2 rotates with the blade assembly 2, so that the liquid can be atomized and sprayed out from the fan assembly 2. The blower 210 further atomizes the liquid sprayed by the blade assembly 2, and makes the atomized liquid be sprayed for a longer distance. The spray nozzle 100 or the blower 210 can be rotated as needed during the working process of the sprayer, so that the spray nozzle 100 and blower 210 connected can rotate together with respect to the sprayer housing 220 and adjust the angle of the spray nozzle 100 with respect to the sprayer housing 220. When the spray has to be stopped, the switch button 700 is turned off to stop the blower 210; and the valve switch 800 is rotated to make the first tube in an isolation state.

The above are only the preferred embodiments of the present disclosure, and are not intended to limit the scope of the present disclosure. Any equivalent modification based on the description and drawings of the present invention without departing from the spirit of the present disclosure, or uses in all other related technical fields, shall fall within the protection scope of the present disclosure.

What is claimed is:

1. A sprayer, comprising:

a sprayer housing, configured to contain a liquid;

a spray nozzle, connected to the sprayer housing and configured to spray the liquid out from the sprayer housing;

a blower, connected with the spray nozzle and the sprayer housing;

an adjusting part; and a fixing assembly for fixedly connecting the sprayer housing and the adjusting part;

wherein the blower is rotatable with respect to the sprayer housing, so as to adjust an angle of the blower with respect to the sprayer housing, enabling an angle of the spray nozzle to be adjusted with respect to the sprayer housing; and the blower is configured to provide the spray nozzle with a force for spraying the liquid out from the sprayer housing through the spray nozzle;

the blower is connected to the sprayer housing through the adjusting part, and the blower is rotatable with respect to the sprayer housing through the adjusting part, so that the angle of the blower with respect to the sprayer housing is adjustable; and the fixing assembly comprises an elastic component and a fixing block; one end of the elastic component is connected with the sprayer housing, and the other end of the elastic component is connected with the fixing block; and the adjusting part is rotatable with respect to the fixing block; the fixing block is engaged with different positions of an outer circumference of the adjusting part, so that the angle of the blower with respect to the sprayer housing is adjustable; and the elastic component is configured to provide an elastic force to the fixing block to maintain the engagement between the fixing block and the adjusting part.

2. The sprayer of claim 1, wherein a plurality of first teeth spaced apart are arranged on the outer circumference of the adjusting part, and a plurality of the second teeth spaced apart are arranged on a side of the fixing block facing the adjusting part; and the second teeth engage with different positions of the first teeth to realize the engagement of the adjusting part and the different positions on the outer circumference of the fixing block.

3. A sprayer, comprising:
a sprayer housing, configured to contain a liquid;
a spray nozzle, connected to the sprayer housing and configured to spray the liquid out from the sprayer housing; and
a blower, connected with the spray nozzle and the sprayer housing;
wherein the blower is rotatable with respect to the sprayer housing, so as to adjust an angle of the blower with respect to the sprayer housing, enabling an angle of the spray nozzle to be adjusted with respect to the sprayer housing; and the blower is configured to provide the spray nozzle with a force for spraying the liquid out from the sprayer housing through the spray nozzle; and
the spray nozzle comprises a transmission component and a blade assembly; the blower is connected to the blade assembly via the transmission component; and the blade assembly is rotatable with respect to the transmission component to form a vacuum environment inside the blade assembly, so that the liquid to be atomized under atmospheric pressure enters the blade assembly through the transmission component; and the blade assembly drives the liquid in the fan assembly to rotate, so that the liquid is atomized and sprayed out from the blade assembly.

4. The sprayer of claim 3, wherein the blade assembly comprises a fan blade and a water outlet connected to the fan blade; the water outlet is hollow; and the transmission component passes through the fan blade and extends to an interior of the water outlet; the water outlet rotates with the fan blade with respect to the transmission component to form a vacuum environment inside the water outlet, so that the liquid under atmospheric pressure enters the blade assembly through the transmission component; and the blade assembly drives the liquid in the fan assembly to rotate, so that the liquid is atomized and sprayed out from the blade assembly.

5. The sprayer of claim 4, wherein the blade assembly further comprises a connecting pipe; the fan blade and the water outlet are arranged on the connecting pipe; the transmission component is inserted in one end of the connecting pipe; and the fan blade rotates with respect to the transmission component, and the water outlet is driven to rotate through the connecting pipe; and the liquid under atmospheric pressure enters the water outlet via the transmission component and the connecting pipe.

6. The sprayer of claim 5, wherein the water outlet is flared towards an end of the water outlet away from the fan blade.

* * * * *